(12) United States Patent
Rakaczki

(10) Patent No.: US 7,748,125 B2
(45) Date of Patent: Jul. 6, 2010

(54) RECIPROCATING SAW WITH FASTENING DEVICE FOR A SAW BLADE

(75) Inventor: Janos Rakaczki, Miskolc (HU)

(73) Assignee: Robert Bosch GmbH, Stuttgart (DE)

( * ) Notice: Subject to any disclaimer, the term of this patent is extended or adjusted under 35 U.S.C. 154(b) by 509 days.

(21) Appl. No.: 11/616,089

(22) Filed: Dec. 26, 2006

(65) Prior Publication Data

US 2007/0151112 A1    Jul. 5, 2007

(30) Foreign Application Priority Data

Dec. 30, 2005    (DE) .................... 10 2005 063 015

(51) Int. Cl.
*B27B 19/02* (2006.01)
(52) U.S. Cl. .................... 30/392; 30/339; 279/79
(58) Field of Classification Search ............. 30/157, 30/329, 337, 338, 339, 392; 279/76, 79
See application file for complete search history.

(56) References Cited

U.S. PATENT DOCUMENTS

| 3,750,283 | A  |   | 8/1973  | Hoffman            |         |
|-----------|----|---|---------|--------------------|---------|
| 4,528,753 | A  | * | 7/1985  | Kuhlmann et al.    | 30/392  |
| 4,550,500 | A  |   | 11/1985 | Kuhlmann et al.    |         |
| 5,103,565 | A  | * | 4/1992  | Holzer, Jr.        | 30/392  |
| 5,263,972 | A  | * | 11/1993 | Evans et al.       | 606/176 |
| 5,324,052 | A  | * | 6/1994  | Ortmann            | 279/83  |
| 5,443,276 | A  | * | 8/1995  | Nasser et al.      | 279/77  |
| 5,458,346 | A  |   | 10/1995 | Briggs             |         |
| 6,134,788 | A  | * | 10/2000 | Chen et al.        | 30/125  |
| 6,237,231 | B1 |   | 5/2001  | Jungmann et al.    |         |
| 6,260,281 | B1 | * | 7/2001  | Okumura et al.     | 30/392  |
| 7,210,232 | B2 | * | 5/2007  | Guo                | 30/392  |
| 2003/0121387 | A1 |  | 7/2003  | Wheeler et al.     |         |

FOREIGN PATENT DOCUMENTS

DE    32 47 178    6/1984
GB    2 342 314    4/2000

* cited by examiner

*Primary Examiner*—Hwei-Siu C Payer
(74) *Attorney, Agent, or Firm*—Michael J. Striker

(57) ABSTRACT

A reciprocating saw has a saw blade, a fastening device provided for the saw blade and holding the saw blade in a non-rotating fashion, a reciprocating lifting rod having a free end supporting the fastening device, a locking element provided for axially fixing the saw blade in the fastening device, and having an adjusting spring that acts in a direction of the saw blade, wherein the locking element is movable between a release position and a locked position and holds the saw blade in the locked position in a form-locked fashion.

13 Claims, 5 Drawing Sheets

RECIPROCATING SAW WITH FASTENING DEVICE FOR A SAW BLADE

CROSS-REFERENCE TO A RELATED APPLICATION

The invention described and claimed hereinbelow is also described in German Patent Application DE 102005063015.4 filed on Dec. 30, 2005. This German Patent Application, whose subject matter is incorporated here by reference, provides the basis for a claim of priority of invention under 35 U.S.C. 119(a)-(d).

BACKGROUND OF THE INVENTION

The present generally relates to reciprocating saws. More particularly, it relates to a reciprocating saw with a fastening device for a saw blade.

DE 32 471 78 C2 has disclosed a jigsaw with a fastening device for a flat jigsaw blade. The known fastening device includes a rotating element that is affixed to a lifter rod and is provided with an external thread onto which a locking sleeve equipped with a through opening for a saw blade shaft can be screwed. In order to insert the jigsaw, the locking sleeve must be rotated until the shaft of the jigsaw blade can be inserted through the through opening. After insertion of the shaft, the locking sleeve must be tightened again, during which the lateral cams of the jigsaw blade are pushed into corresponding recesses of the rotating element.

The disadvantage of the known reciprocating saw is that changing tools is time-consuming because it is necessary to rotate the locking sleeve. In addition, it is not possible to prevent the locking sleeve from loosening by itself due to the oscillations occurring during operation of the jigsaw.

SUMMARY OF THE INVENTION

Accordingly, it is an object of the present invention to provide a reciprocating saw which eliminates the disadvantages of the prior art.

More particularly, it is an object of the present invention to provide a reciprocating saw whose saw blade can on the one hand be securely attached and on the other hand can be quickly replaced.

In keeping with these objects and with others which will become apparent hereinafter, one feature of the present invention, resides, briefly stated, in a reciprocating saw, comprising a saw blade; a fastening device provided for said saw blade and holding said saw blade in a non-rotating fashion; reciprocating lifting rod having a free end supporting said fastening device; a locking element provided for axially fixing said saw blade in said fastening device, and having an adjusting spring that acts in a direction of said saw blade, said locking element being movable between a release position and a locked position and holding said saw blade in said locked position in a form-locked fashion.

The present invention is based on the concept of providing a spring-loaded locking element that can be moved between a release position and a locked position. In the locked position, the locking element attaches the saw blade to the fastening device and thus to the lifter rod in a form-locked fashion. This simply and securely prevents an axial movement of the saw blade. Because the locking element is spring-loaded toward the saw blade, this urges the locking element to assume the locked position.

At a predetermined position, the locking element automatically engages in detent fashion with the saw blade so that the saw blade is secured in the fastening device in captive fashion. This makes it possible to advantageously eliminate the time-consuming rotation of the locking sleeve. By contrast with a locking sleeve, the locking element of the reciprocating saw according to the present invention is advantageously prevented from loosening by itself due to the oscillations occurring during operation of the jigsaw.

In one embodiment of the invention, the locking element can move in the direction lateral to the insertion direction of the saw blade. To produce a form-locked connection between the locking element and the saw blade, when in its locked position, the locking element engages in a recess in the saw blade. In this instance, the recess is advantageously provided with a shape complementary to that of the locking element, particularly in such a way that the form-locked connection has the least possible amount of axial play.

Preferably, the recess is embodied in the form of a continuous opening inside the saw blade. In particular, this opening is let into the flat saw blade, spaced apart from the outer edge of the saw blade. When the saw blade is being inserted into the fastening device, as soon as the opening is brought flush with the locking element, the locking element can engage in detent fashion in the opening.

In order to permit a quick removal of the saw blade from the fastening device, a release button is advantageously provided, with which it is possible to move the locking element into its release position counter to the spring force of the adjusting spring. The release button is advantageously spring-loaded counter to its actuation direction so that the release button automatically returns to its starting position after being released.

A structurally advantageous embodiment of the reciprocating saw according to the invention is achieved if the release button and locking element are situated on opposite sides of the saw blade. In this case, the release button and the locking element advantageously have a common movement axis along which they can be moved in opposition to each other. By means of the release button, the locking element is slid out of the recess of the saw blade, into its release position.

The saw blade and/or the locking element advantageously has an oblique contact surface. The oblique contact surface is inclined lateral to the insertion direction. The oblique contact surface moves the locking element into its release position as the saw blade is being inserted. As the saw blade is inserted farther in the axial direction, the locking element slides along the surface of the saw blade and, when the locking element and the corresponding recess in the saw blade are flush with each other, engages in the recess in detent fashion, consequently fixing the saw blade in the axial direction.

According to a preferred embodiment, the locking element is embodied in the form of a pin that can be slid counter to the force of the adjusting spring. The adjusting spring is advantageously embodied in the form of a coil spring situated coaxial to the movement axis of the locking element. The coil spring advantageously rests against the locking element at one end and against a housing of the fastening device at the other end.

In a modification of the invention, the adjusting spring is advantageously embodied so that it is integrally joined to the locking element. One possibility for implementing an integral embodiment is for the adjusting spring and the locking element together to be embodied in the form of a stamped and bent component. In this instance, it is particularly advantageous if the adjusting spring is embodied in the form of a leaf spring, in particular one made of spring steel. According to a preferred embodiment, the adjusting spring embodied in the form of a leaf spring extends in the fastening device essentially parallel to the insertion direction of the saw blade.

It is advantageous if the saw blade is provided with a longitudinal slot between its fastening end and the recess for accommodating the locking element. This longitudinal slot permits the saw blade to pass by the actuated release button in the axial direction without colliding with the release button.

To this end, the diameter of the release button is selected to be narrower than the width of the longitudinal slot. Naturally, the locking element must be dimensioned in such a way that the saw blade equipped with the longitudinal slot cannot be moved past the locking element when the locking element is situated in the recess.

According to a particularly convenient embodiment, an ejection spring is provided, which exerts spring force on the saw blade in the axial direction. The action of the ejection spring works to press the saw blade out of the fastening device in the direction opposite from the insertion direction.

Preferably, the fastening device includes a housing comprised of two plastic half-shells. These half-shells have the capacity to engage with each other in detent fashion. The inside of the housing accommodates an insert piece made of metal, preferably steel, which encloses the saw blade on both of its broad sides, thus preventing a rotation of the saw blade inside the fastening device. The insert piece advantageously rests against both broad sides of the saw blade.

In order to produce a form-locked connection between the fastening device and the lifter rod, a connecting piece is advantageously provided, which is attached to the lifter rod. The two half-shells embrace this connecting piece and thus lock the fastening device in relation to the lifter rod. Such an embodiment of the fastening device functions with a very small number of components and is also quick to assemble.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
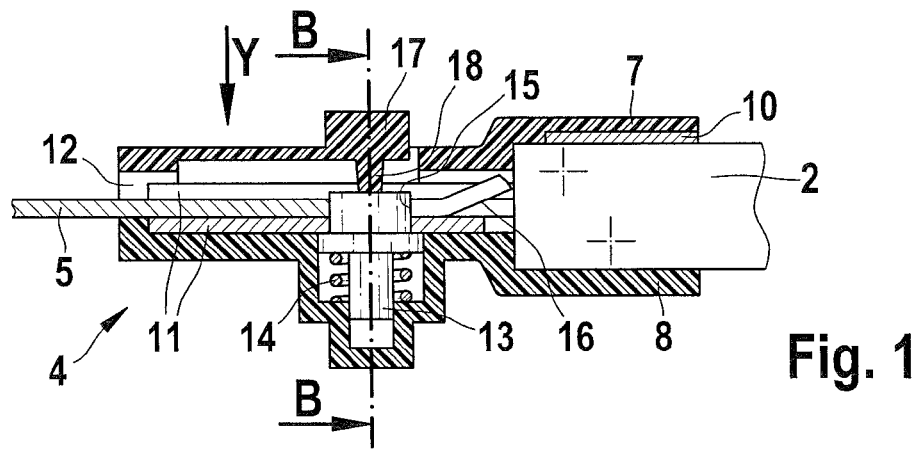
FIG. 1 is a longitudinal section through the fastening device in accordance with the present invention.

In the figures, parts that are the same and those that are functionally equivalent have been provided with the same reference numerals.

Figure 13:
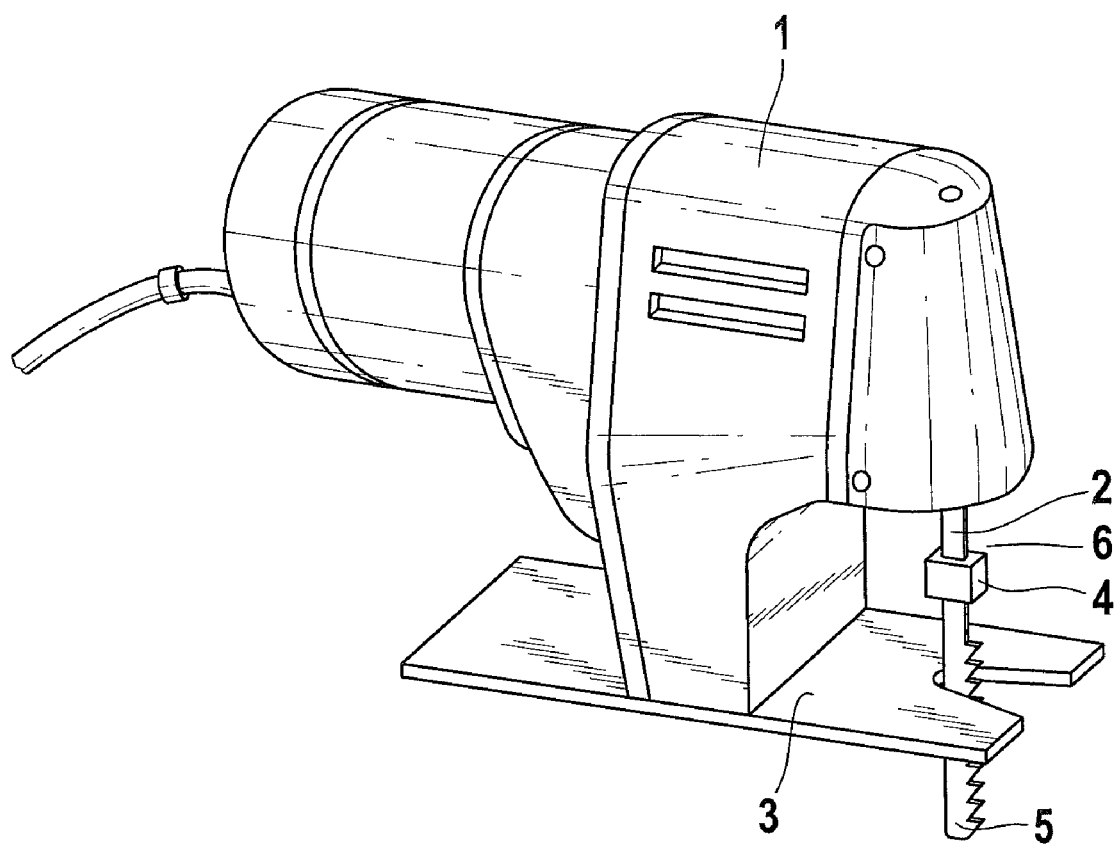
FIG. 13 shows a jigsaw in accordance with the present invention.

FIG. 13 shows a jigsaw 1 embodied in the form of a hand-guided power tool, equipped with a flat lifter rod 2 and a sliding plate 3. The jigsaw 1 has a fastening device 4 for a jigsaw blade 5. The fastening device 4 is attached to the end 6 of the lifter rod 2.

Figure 10:
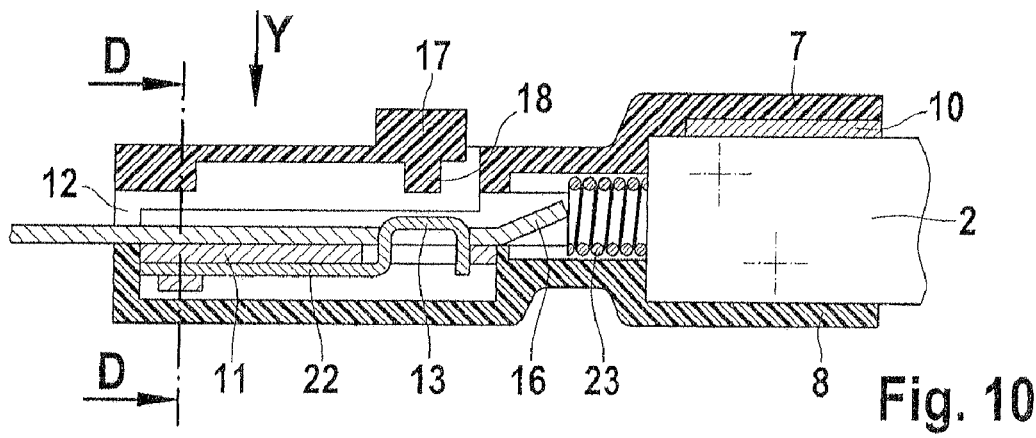
FIG. 10 is a sectional depiction of another embodiment of a fastening device in accordance with the present invention.
Figure 11:
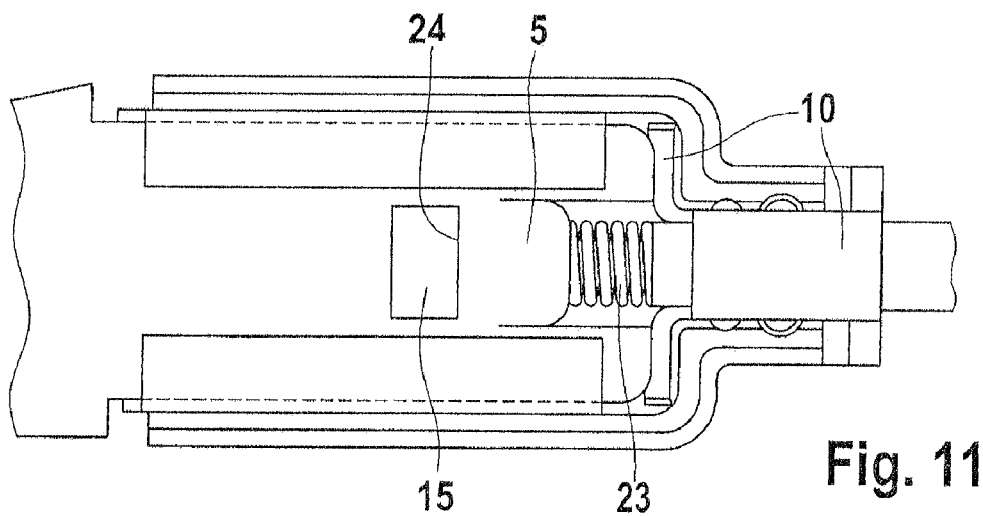
FIG. 11 is a depiction of the fastening device according to FIG. 11, viewed in the Y direction, in which the housing part is not shown in accordance with the present invention.
Figure 12:
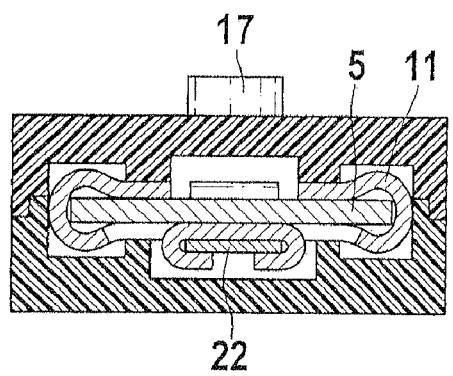
FIG. 12 is a sectional depiction of the fastening device along the cutting line D-D according to FIG. 10 in accordance with the present invention.

FIGS. 1 through 6 show a first embodiment of a fastening device 4. FIGS. 10 through 12 show a second embodiment of the invention.

As is clear from FIG. 1, the fastening device 4 has a housing comprised of a first housing half-shell 7 and a second housing half-shell 8. Both of the housing half-shells 7, 8 are composed of plastic and are attached to each other in detent fashion by detent means 9 that are shown in FIG. 3. The housing half-shells 7, 8 enclose a connecting piece 10, which is riveted to the lifter rod 2 that can move back and forth in the axial direction. As is clear from FIG. 2, the connecting piece 10 extends in the axial direction along the lifter rod 2 and also extends in the lateral direction to this. The enclosure of the connecting piece 10 between the two housing half-shells 7, 8 produces a form-locked connection between the lifter rod 2 and the fastening device 4.

Figure 5:
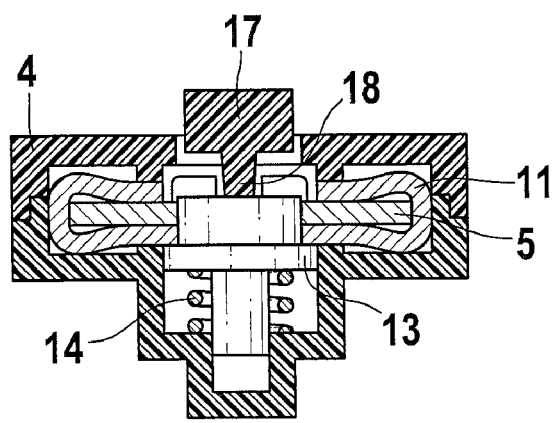
FIG. 5 is a sectional depiction of the fastening device along the cutting line B-B according to FIG. 1 in accordance with the present invention.
Figure 6:
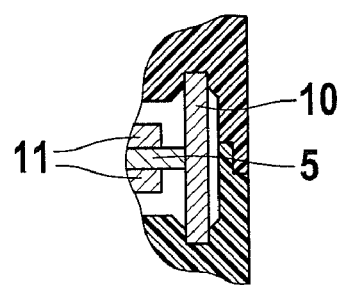
FIG. 6 is an incomplete sectional depiction of the fastening device along the cutting line A-A according to FIG. 2 in accordance with the present invention.

The inside of the two housing half-shells 7, 8 accommodates an insert piece 11 that encompasses the jigsaw blade 5, as is particularly visible in FIG. 5. The insert piece 11 is a steel component that is bent at the edges so that it rests against both of the broad sides of the jigsaw blade 5. The insert piece 11 prevents a movement of the jigsaw blade 5 in the lateral direction and prevents a rotation of the jigsaw blade 5 inside the fastening device 4.

The jigsaw blade 5 is inserted axially into the fastening device 4 through an opening 12 formed by the housing half-shells 7, 8 and is accommodated in clamping fashion by the insert piece 11. In order to fix the jigsaw blade 5 in the axial direction, a locking element 13 is provided, which is embodied in the form of a pin. The locking element 13 is supported so that it can move lateral to the insertion direction of the jigsaw blade 5. An adjusting spring 14 embodied in the form of a coil spring exerts spring force on the locking element 13 in the direction of the jigsaw blade 5. This causes the locking element 13 to engage in detent fashion in a complementary shaped recess 15 inside the jigsaw blade 5, thus preventing an axial movement of the jigsaw blade 5.

Upon insertion of the jigsaw blade 5, the locking element 13 is slid from the locked position shown in FIG. 1, counter to the force of the adjusting spring 14, and into a release position. To this end, the fastening end of the jigsaw blade 5 is bent laterally, thus constituting an oblique contact surface 16 for the locking element 13. The jigsaw blade 5 is inserted into the fastening device 4 in the axial direction until the locking element 13 is flush with the recess 15 and, due to the spring force of the adjusting spring 14, is moved in the lateral direction, thus engaging in detent fashion in the recess 15, as shown in FIG. 1.

In order to then be able to remove the jigsaw blade 5 axially from the fastening device 4 once again, the locking element 13 must be slid into its release position counter to the force of the adjusting spring 14. A release button 17 with an extension 18 is provided for this purpose. The release button 17 is situated on the side of the jigsaw blade 5 opposite from the locking element 13. As is clear from FIG. 3, the release button 17 with the extension 18 is embodied as a component of the first housing half-shell 7. In this case, the release button 17 is mounted on a spring tab 19.

In order to release the jigsaw blade 5, the release button 17 is pressed toward the jigsaw blade 5 counter to the force of the spring tab 19. The release button 17 can be actuated either directly or, for the case in which the reciprocating saw is equipped with a guard, can be actuated by means of a switch. The extension 18 pushes the locking element 13 out of its locked position and into its release position counter to the spring force of the adjusting spring 14. While the release button 17 is being held down, the jigsaw blade 5 can be withdrawn from the opening 12 in the axial direction.

Figure 2:
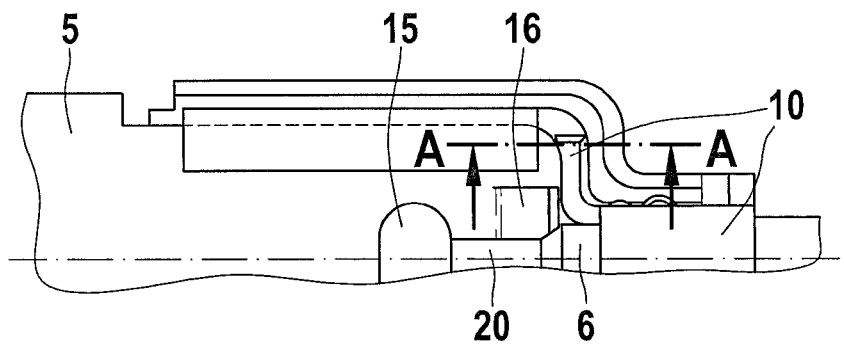
FIG. 2 is a depiction of the fastening device, viewed in the Y direction, in which the housing part is not shown in accordance with the present invention.
Figure 3:
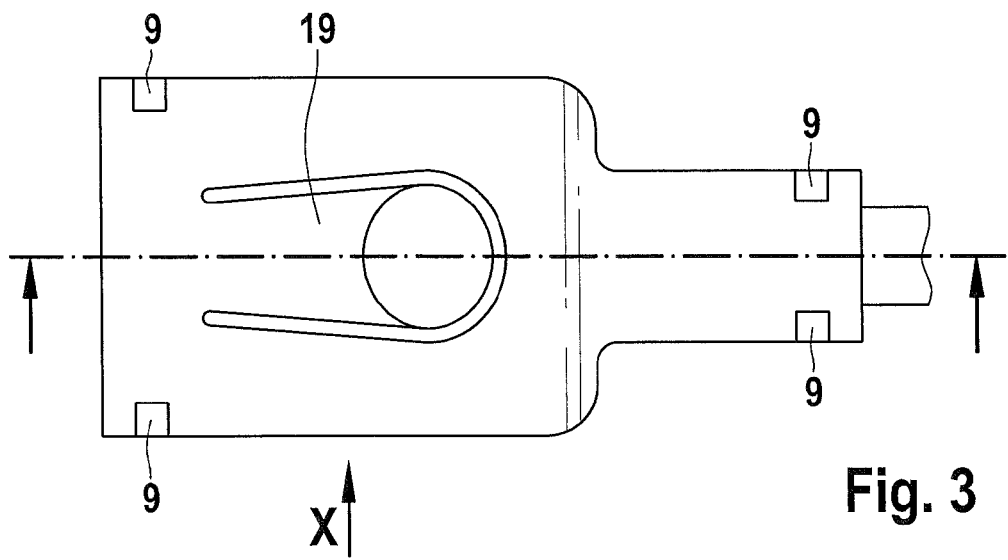
FIG. 3 shows the housing part that is not shown in FIG. 2 in accordance with the present invention.
Figure 4:
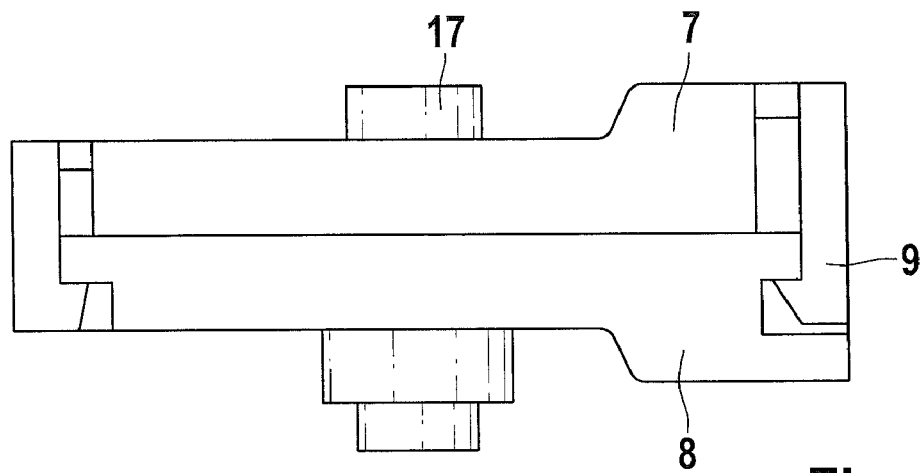
FIG. 4 is a side view of the fastening device, viewed in the X direction in accordance with the present invention.

During this removal motion, in order to prevent a collision between the release button 17 and a jigsaw blade 5 or between the extension 18 and the jigsaw blade 5, the jigsaw blade 5 is provided with a longitudinal slot 20 extending in the axial direction (see FIG. 2). The width dimension of the longitudinal slot 20 is greater than the diameter of the extension 18 so that the jigsaw blade 5 can be moved in the axial direction in relation to the extension 18. After the release button 17 is released, the locking element 13 springs back into its locked position and must once again be slid in the lateral direction upon insertion of the next jigsaw blade 5.

Figure 7:
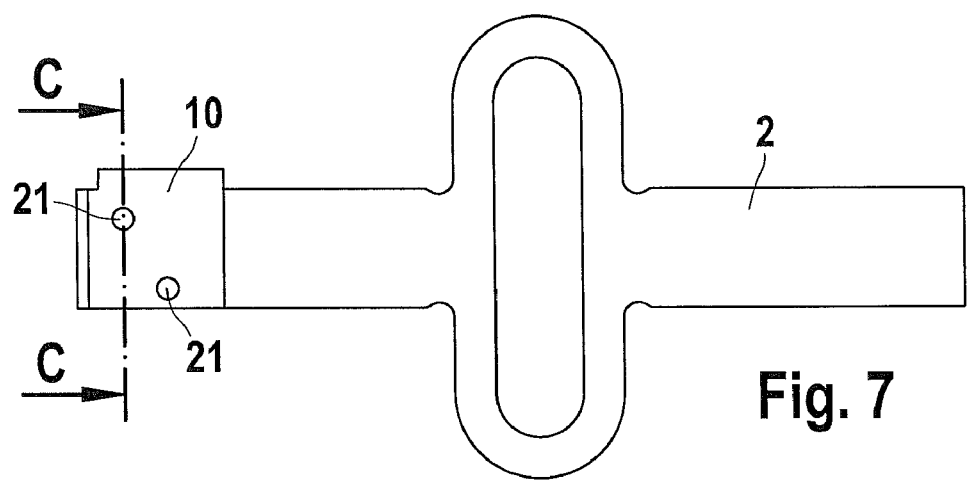
FIG. 7 shows a lifter rod with a connecting piece.
Figure 8:
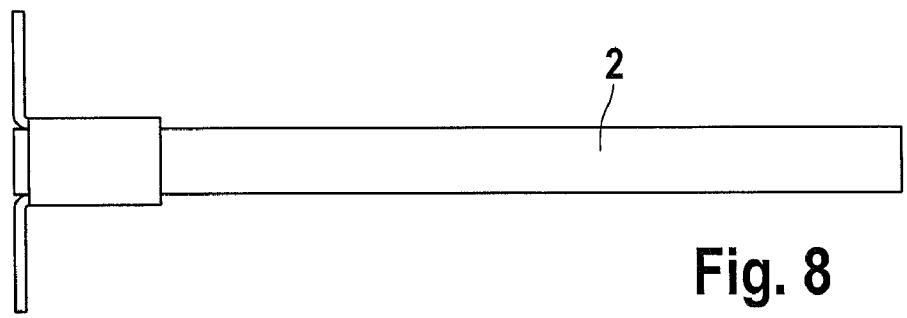
FIG. 8 is a depiction of the lifter rod rotated by 90° in relation to FIG. 7.
Figure 9:
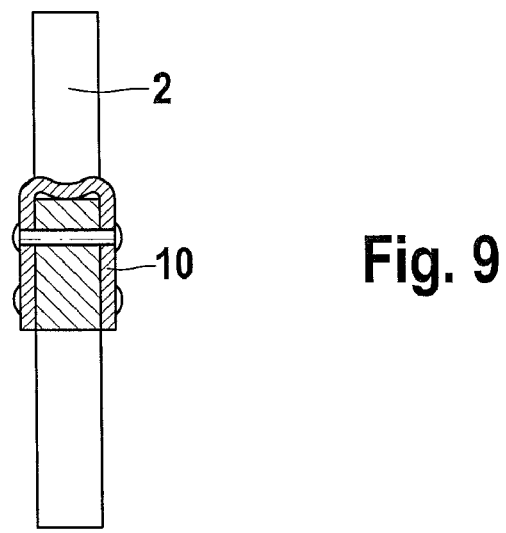
FIG. 9 is a sectional depiction of the lifter rod along the cutting line C-C according to FIG. 7 in accordance with the present invention.

FIGS. 7 through 9 show various views of the flat lifter rod 2. It is clear from the drawings that the connecting piece 10 is fastened to the lifter rod 2 by means of rivets 21.

FIGS. 10 through 12 show another embodiment of the present invention. The pin with the coil spring 14 has been replaced by a leaf spring 22. At its free end, the leaf spring 22 is embodied in the form of a locking element 13. The leaf spring 22 extends essentially parallel to the jigsaw blade 5. The locking element 13 is embodied as a U-shaped bend that engages in the recess 15 of the jigsaw blade 5. By means of the release button 17 with the extension 18, the locking element 13 can be moved into its release position counter to the force of the leaf spring 22.

In the exemplary embodiment according to FIGS. 10 through 12, the jigsaw blade 5 is embodied without a longitudinal slot. In lieu of this, an ejection spring 23 is provided, which is prestressed as the jigsaw blade 5 is inserted into the opening 12. When the release button 17 is pushed, this moves the locking element 13 in the lateral direction, thus releasing the jigsaw blade 5 in the axial direction. The ejection spring 23 then moves the saw blade 5 a short distance in the axial direction until an upper edge 24 of the recess 15 strikes against the extension 18. In this position, the locking element 13 is no longer able to engage in detent fashion in the recess 15 since the recess 15 is no longer flush with the locking element to 13. If the release button 17 is then released, the jigsaw blade 5 is ejected and can be withdrawn from the opening 12 in the axial direction.

It will be understood that each of the elements described above, or two or more together, may also find a useful application in other types of constructions differing from the types described above.

While the invention has been illustrated and described as embodied in a reciprocating saw with fastening device for a saw blade, in particular drilling screwdriver, it is not intended to be limited to the details shown, since various modifications and structural changes may be made without departing in any way from the spirit of the present invention.

Without further analysis, the foregoing will so fully reveal the gist of reveal present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A reciprocating saw, comprising a saw blade; a fastening device provided for said saw blade and holding said saw blade in a non-rotating fashion; a reciprocating lifting rod having a free end supporting said fastening device; a locking element provided for axially fixing said saw blade in said fastening device, and having an adjusting spring that acts in a direction of said saw blade, said locking element being movable between a release position and a locked position and holding said saw blade in said locked position in a form-locked fashion, wherein said saw blade has a recess, said locking element being supported so that it is movable in a lateral direction in relation to said saw blade and in the locked position engages in said recess of said saw blade; and a release button moving said locking element counter to a spring force of said adjusting spring out of said recess and into said release position, wherein said release button and said locking element are situated on opposite sides of said saw blade, and wherein the release button has an extension and is formed as a component of a first housing half-shell of the fastening device and is mounted on a spring tab of the first housing half-shell.

2. A reciprocating saw as defined in claim 1, wherein an element selected from the group consisting of said saw blade, said locking element and both has an oblique contact surface configured to move said locking element into its release position as said blade is being inserted axially into said fastening device.

3. A reciprocating saw as defined in claim 1, wherein said locking element is configured as a pin.

4. A reciprocating saw as defined in claim 1, wherein said adjusting spring is configured as a coil spring.

5. A reciprocating saw as defined in claim 1, wherein said locking element is configured as a pin, while said adjusting spring is configured as a coil spring.

6. A reciprocating saw as defined in claim 1, wherein said adjusting spring is integrally joined to said locking element.

7. A reciprocating saw as defined in claim 6, wherein said adjusting spring is configured as a leaf spring.

8. A reciprocating saw as defined in claim 1 wherein said saw blade has a slot extending in an axial direction from its fastening end to said recess for said locking element.

9. A reciprocating saw as defined in claim 1; and further comprising an ejection spring which exerts spring force on said saw blade in an axial direction counter to an insertion direction.

10. A reciprocating saw as defined in claim 1, wherein said fastening device has a housing composed of said first housing half-shell and a second housing half-shell which are joinable to each other; and a metal insert piece located inside of said housing and securing said saw blade in a non-rotating fashion.

11. A reciprocating saw as defined in claim 10, wherein said housing having said two half-shells is composed of plastic.

12. A reciprocating saw as defined in claim 10, wherein said two half-shells are joinable to each other in detent fashion.

13. A reciprocating saw as defined in claim 10; and further comprising a connecting piece which is attached to said lifting rod and enclosed by said two half-shells in form-locked manner.

\* \* \* \* \*